(12) United States Patent
Mousseau

(10) Patent No.: US 7,882,543 B2
(45) Date of Patent: *Feb. 1, 2011

(54) SYSTEMS AND METHODS FOR ADDED AUTHENTICATION IN DISTRIBUTED NETWORK DELIVERED HALF-DUPLEX COMMUNICATIONS

(75) Inventor: Gary P. Mousseau, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1000 days.

This patent is subject to a terminal disclaimer.

(21) Appl. No.: 10/580,020

(22) PCT Filed: Nov. 19, 2004

(86) PCT No.: PCT/CA2004/001994

§ 371 (c)(1),
(2), (4) Date: Mar. 7, 2007

(87) PCT Pub. No.: WO2005/051008

PCT Pub. Date: Jun. 2, 2005

(65) Prior Publication Data

US 2007/0280479 A1    Dec. 6, 2007

Related U.S. Application Data

(60) Provisional application No. 60/523,466, filed on Nov. 19, 2003.

(51) Int. Cl.
H04L 29/06 (2006.01)
H04L 29/00 (2006.01)
H04L 12/16 (2006.01)

(52) U.S. Cl. ............ 726/4; 726/2; 726/3; 726/21; 455/90.2; 455/78; 455/466; 455/500; 455/518; 713/182; 713/187; 709/225

(58) Field of Classification Search ............ None
See application file for complete search history.

(56) References Cited

U.S. PATENT DOCUMENTS

| 6,256,733 | B1 | 7/2001 | Thakkar et al. |
| 6,321,095 | B1 * | 11/2001 | Gavette ............ 455/517 |
| 6,363,258 | B1 | 3/2002 | Schmidt et al. |
| 6,449,491 | B1 | 9/2002 | Dailey |
| 7,130,282 | B2 * | 10/2006 | Black ............ 370/296 |
| 7,328,036 | B2 * | 2/2008 | Hart et al. ............ 455/518 |
| 7,382,768 | B2 * | 6/2008 | Doerr et al. ............ 370/352 |
| 7,570,966 | B2 * | 8/2009 | Zhao et al. ............ 455/518 |

(Continued)

FOREIGN PATENT DOCUMENTS

WO    WO 01/67674 A2    9/2001

OTHER PUBLICATIONS

Architecture V1.1.0; Push-to-Talk over Cellular (PoC); Architecture; PoC Release 1.0, Aug. 2003.

(Continued)

*Primary Examiner*—Syed A. Zia
(74) *Attorney, Agent, or Firm*—John J. Oskorep, Esq.

(57) ABSTRACT

In half-duplex communications over a wireless network, a user from a private organization sends the request for half-duplex communication through a private server controlled by the private organization. The private server sets up a private account with the wireless carrier and the user communicates via the private account.

33 Claims, 7 Drawing Sheets

U.S. PATENT DOCUMENTS

| | | | |
|---|---|---|---|
| 2002/0061761 | A1 | 5/2002 | Maggenti et al. |
| 2003/0016632 | A1 | 1/2003 | Refai et al. |
| 2003/0056093 | A1 | 3/2003 | Huitema et al. |
| 2003/0153339 | A1 | 8/2003 | Crockett et al. |
| 2003/0204734 | A1* | 10/2003 | Wheeler ............... 713/184 |
| 2004/0202117 | A1 | 10/2004 | Wilson et al. |
| 2004/0224710 | A1* | 11/2004 | Koskelainen et al. ........ 455/518 |
| 2005/0286473 | A1* | 12/2005 | Stubbs ................. 370/331 |
| 2009/0203331 | A1* | 8/2009 | Ranalli et al. ............. 455/90.2 |
| 2010/0178869 | A1* | 7/2010 | Mauney et al. ............. 455/41.2 |

OTHER PUBLICATIONS

Architecture V2.0.8; Push-to-Talk over Cellular (PoC); Architecture; PoC Release 2.0; Comneon, Ericsson, Motorola, Nokia and Siemens; Jun. 2004.

Push-to-Talk over Cellular Requirements Version 1.0-2004; Open Mobile Alliance; OMA-RD_PoC-V1_0-20040-C.

Group Management Requirements; Candidate Version 1.0-30 Sep. 2004; Open Mobile Alliance; OMA-CP-POC-V1_0-20040930-C.

OMA POC Control Plane, Draft Version 1.0-02004; Open Mobile Alliance; OMA-CP-POC-V1_0-20040-D.

Push-to-Talk over Cellular (PoC); Architecture; Draft Version 1.0—Oct. 2004; OMA-AD_PoC-V1_0-20041005-D.

List Management and Do-not-Disturb V2.0.6; Push-to-Talk over Cellular (PoC); List Management and Do-not-Disturb; PoC Release 2.0; Comneon, Ericsson, Motorola, Nokia and Siemens; Jun. 2004.

\* cited by examiner

SYSTEMS AND METHODS FOR ADDED AUTHENTICATION IN DISTRIBUTED NETWORK DELIVERED HALF-DUPLEX COMMUNICATIONS

RELATED APPLICATION

This application claims the benefit of U.S. Provisional Application No. 60/523,466 filed Nov. 19, 2003.

TECHNICAL FIELD

The patent application relates generally to systems and methods for half-duplex communications over wireless networks, such as Push-to-Talk™ over Cellular (PoC).

DESCRIPTION OF THE RELATED ART

Network delivered half-duplex communications, such as those provided by PoC architectures for example, provide wireless devices with the ability to communicate with each other in a half-duplex manner, much like walkie-talkies, but over a network.

Referring to FIG. 1, there is shown a conventional PoC architecture defined by 3GPP standards bodies for implementing half-duplex communications. The specification under development from the Open Mobile Alliance™ is: OMA-AD_PoC-V1_0-20031017-D and OMA-AD_PoC-V1_0-20041005-D. Both of these specifications are incorporated herein by reference in their entirety. In the conventional architecture, the components of the PoC architecture are located within the carrier's network or a directly related third-party service provider. A PoC client device 101 is shown accessing a carrier network 100 for half-duplex communication through wireless access network 103. Within the carrier network 100, there is a SIP/IP Core 102. Some of the functions of the SIP/IP Core include routing the SIP signalling between the PoC client device, authenticating and authorising PoC users, and charge reporting. The carrier network also has a Group and List Management Server (GLMS) 104, PoC server 106 and presence server 108. The GLMS server 104 manages groups, contact lists and access lists. The PoC server 106 functions include, among other things, SIP and group session handling, policy control for access to groups, group session control, and access control. The presence server 108 manages presence information and combines various presence-related information into a single presence document.

As shown in FIG. 1, in the conventional architecture, a POC client 101 of a wireless network accesses the PoC element through the network's POC server 106, the network's SIP/IP core 102 or the network's GLMS 104. The conventional architecture is network operator centric, where a single operator or carrier runs all necessary components to make the solution function. All identities used for conversations and group chats are publicly available to other PoC users through the carrier's Group and List Management Server (GLMS) 104. Requests for conversations and group chats are made to the carrier's SIP Core 102 using only SIP identities. The ability for latecomers to join a chat session is also supported. These requirements mean that the ability to create PoC sessions is not very private and eavesdropping could become commonplace.

SUMMARY

In a first aspect, there is provided a method comprising: a wireless user device interacting with a private authentication element to obtain identities of private user devices; the wireless user device sending a request to a CHDP (carrier half-duplex processing element), the request identifying at least one invitee private user device; the CHDP sending a request for authentication of the at least one invitee private user device to the private authentication element; the private authentication element authenticating the at least one invitee private user device and sending an authentication response to the CHDP indicating whether or not the at least one invitee private user device is authenticated; the CHDP sending invitations to authenticated invitee private user devices and receiving acceptances/rejections; and the CHDP setting up a half-duplex communications session for authenticated users that have accepted the invitation.

In a second aspect, there is provided a method comprising: a private authentication element interacting with a wireless user device to establish private identities of private user devices; the private authentication element receiving a request for authentication of the private identities from a carrier half-duplex processing element associated with a requested half-duplex communications session; the private authentication element authenticating the private identities; and the private authentication element sending an authentication response to the carrier half-duplex processing element indicating whether or not the private identities are authenticated.

In a third aspect, there is provided a method in a wireless user device comprising: the wireless user device interacting with a private authentication element to obtain private identities of private user devices; and the wireless user device sending a request for half-duplex communication identifying at least one invitee private user device to a CHDP, the request indicating to the CHDP to perform authentication of the at least one invitee private user device with the private authentication element.

In a fourth aspect, there is provided a carrier half-duplex processing element (CHDP) comprising: a first input for receiving requests from a client device for half-duplex communications session with at least one private user device in response to which the CHDP generates an authentication request for authentication of private identities of private user devices; an output for sending the authentication request to a private authentication element; a second input for receiving an authentication response from the private authentication element; and wherein in the event of successful authentication, the CHDP invites the private user devices to participate in the half-duplex communications session and sets up a half-duplex communications session between devices that accept.

In a fifth aspect, there is provided a system for authenticating private users from a private network when conducting instant communications over a carrier network, the system comprising: a carrier processing element configured to receive a request for an instant communications session from a wireless user device, to send an authentication request of an identity of at least one private invitee user device to a private authentication element, to send an invitation for the instant communications session to the at least one private invitee user device if an authentication is response received from the private authentication element, and to set up the instant communications session between the wireless user device and the at least one private invitee user device; and a private authentication element configured to establish authenticated identities of private user devices, to receive the authentication request from the carrier processing element, to authenticate the identities and to send the authentication response back to the carrier processing element indicating whether or not the identities are authenticated.

In an embodiment, a PoC solution provides a corporate authentication service that proxies both GLMS and PoC Server requests to ensure that a corporation authenticates all participants in a PoC Session. This authentication ensures that all PoC users have been authenticated by the corporation and creates private and authenticated PoC Sessions.

In another embodiment, a network-centric PoC Server extends its functionality to include an authentication step. This authentication step can be offered by a corporate-based GLMS component via a network-centric GLMS component with an authentication component or directly to the corporate-based GLMS.

BRIEF DESCRIPTION OF THE DRAWINGS

Embodiments will now be described in greater detail with reference to the accompanying diagrams, in which.

DETAILED DESCRIPTION OF THE DRAWINGS

It would be advantageous to have authentication for half-duplex communications services such as PoC provided to corporate users. The current architectures for half-duplex communication over wireless networks, such as PoC, do not address the corporate requirement for authentication. It would be advantageous to authenticate the users in a half-duplex chat session, such as PoC, or to create authenticated groups.

In some settings it would be advantageous to be able to limit a half-duplex conversation to employees of a specific company or individuals that are part of a specific deal being formed. By authenticating the user who initiates the conversation and each invitee, all participants in the conversation can be confident that when a user says he or she is 'Person X', they are truly 'Person X' as confirmed by some authority, such as a corporate Security Identity Name Server or an authenticated corporate GLMS.

Figure 1:
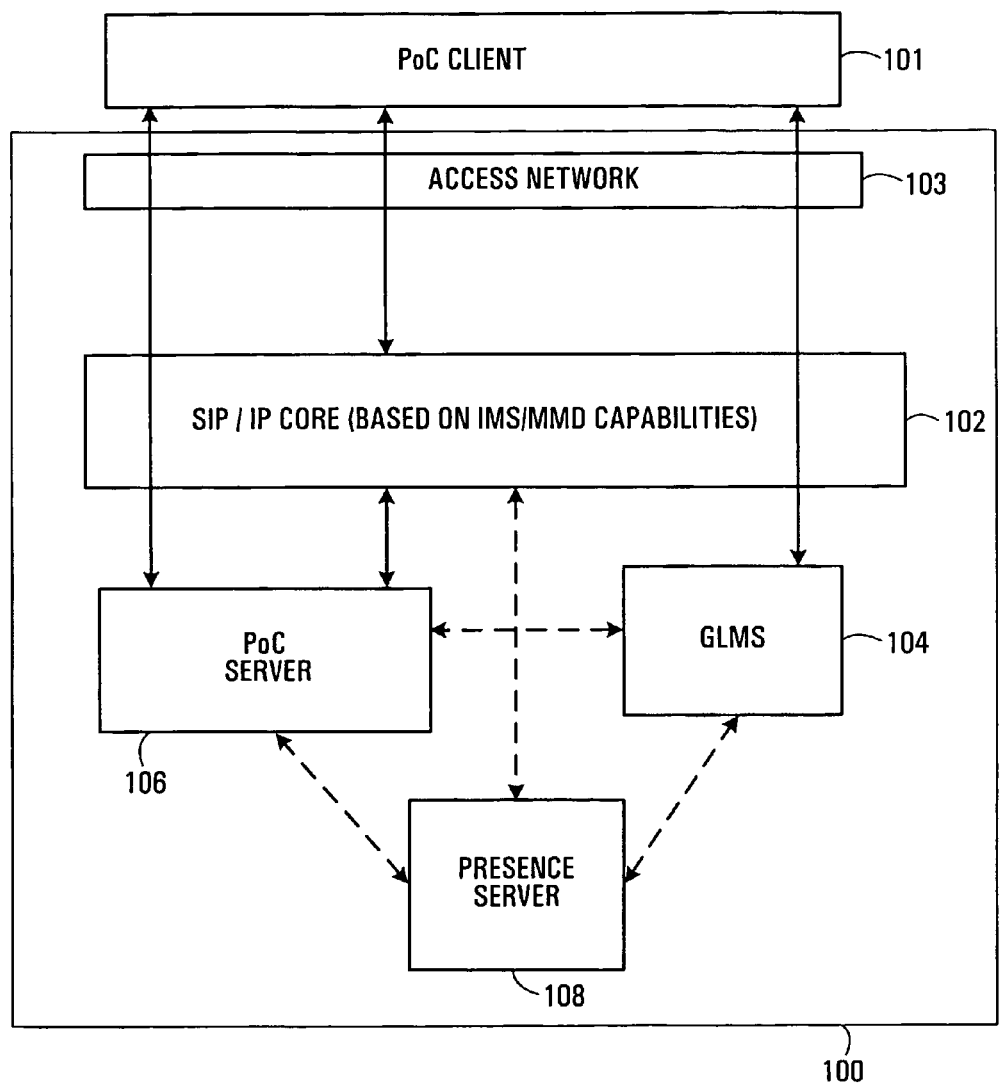
FIG. 1 is a block diagram of a conventional PoC architecture defined within the 3GPP standards bodies for implementing PoC.
Figure 2:
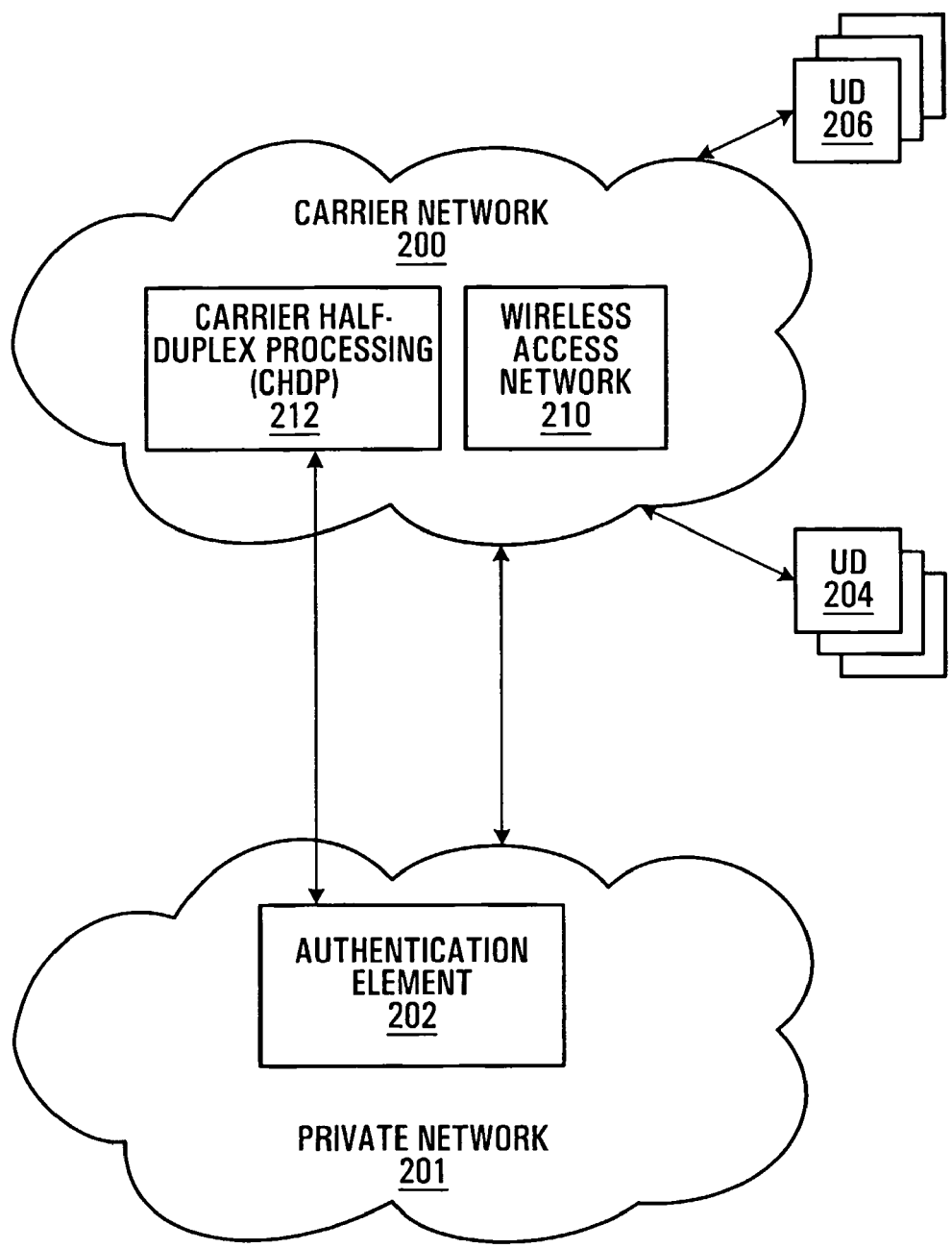
FIG. 2 is a block diagram of a general architecture for providing authentication of half-duplex users.

FIG. 2 shows a general architecture for authenticating half-duplex users. A carrier network 200 is shown. The carrier network has wireless access network element 210 and CHDP (carrier half-duplex processing element) 212 generally representing any element(s) within the carrier network that participates in the delivery of network provided half-duplex communications. Also shown is a private network 201 that might be operated by a private organization for example. The private network 201 is "private" in the sense that it is under the control of a different party than the carrier network 200. The private network 201 includes a private authentication element 202 that authenticates users from the private network 201 for participation in half-duplex communications. The private authentication element is one or more of hardware and software that can be added to a distinct component or a standard component. In some embodiments the private authentication element sits on a secure identity server such as a GLMS. For illustration purposes the private authentication element 202 is depicted within the private network 201. However, in some embodiments the private authentication element 202 is physically located outside the premises of the private network 201. The private network can be any set of users, such as a corporation with employees as its users.

A set of regular half-duplex wireless user devices (UD) is indicated at 206. A "regular half-duplex wireless user device" is a device equipped to function as a regular half-duplex client. Half-duplex functionality is provided to these clients in a normal manner by the CHDP 212. Also shown is a set of private half-duplex wireless user devices 204 associated with the private network 201. A private half-duplex device is a device equipped to function as a private half-duplex client. Half-duplex communications are provided to the private half-duplex wireless user devices 204 by the CHDP 212 in co-operation with the private authentication element 202 as detailed below. Examples of wireless user devices include hand-held wireless devices, wireless enabled laptop computers, wireless enabled desktop computers, Smartphones, wireless enabled PDAs (Personal Digital Assistants), and cellular handsets.

In some embodiments, a given wireless user device is equipped to function in multiple modes of operation. In some implementations, a given "private wireless user device" has mode(s) of operation that allow the device to operate in a similar manner to regular wireless user devices. A given wireless user device might be equipped with both the regular half-duplex client and the private half-duplex client capabilities. Such a wireless user device might switch between being a "regular wireless user device" and a "private wireless user device" dynamically. Such a wireless user device has two user identifiers—one for regular use and one for private use. Such a wireless user device can then initiate/participate in a regular half-duplex communication that would be processed by CHDP in a normal manner, or could initiate/participate in the added authentication features of the half-duplex communication described below.

By way of overview, in operation, upon receipt of a request for authenticated half-duplex communication from a private wireless user device 204, the CDHP routes an authentication request to the private authentication element 202 of the private network 201. The private authentication element 202 authenticates the user who initiates a half-duplex conversation and the invitees and informs the CDHP of the result. If authentication is successful, the half-duplex communications is made possible. In some embodiments, a user selects the invitees from a list of possible invitees that was created in co-operation with the authentication element 202.

Figure 3:
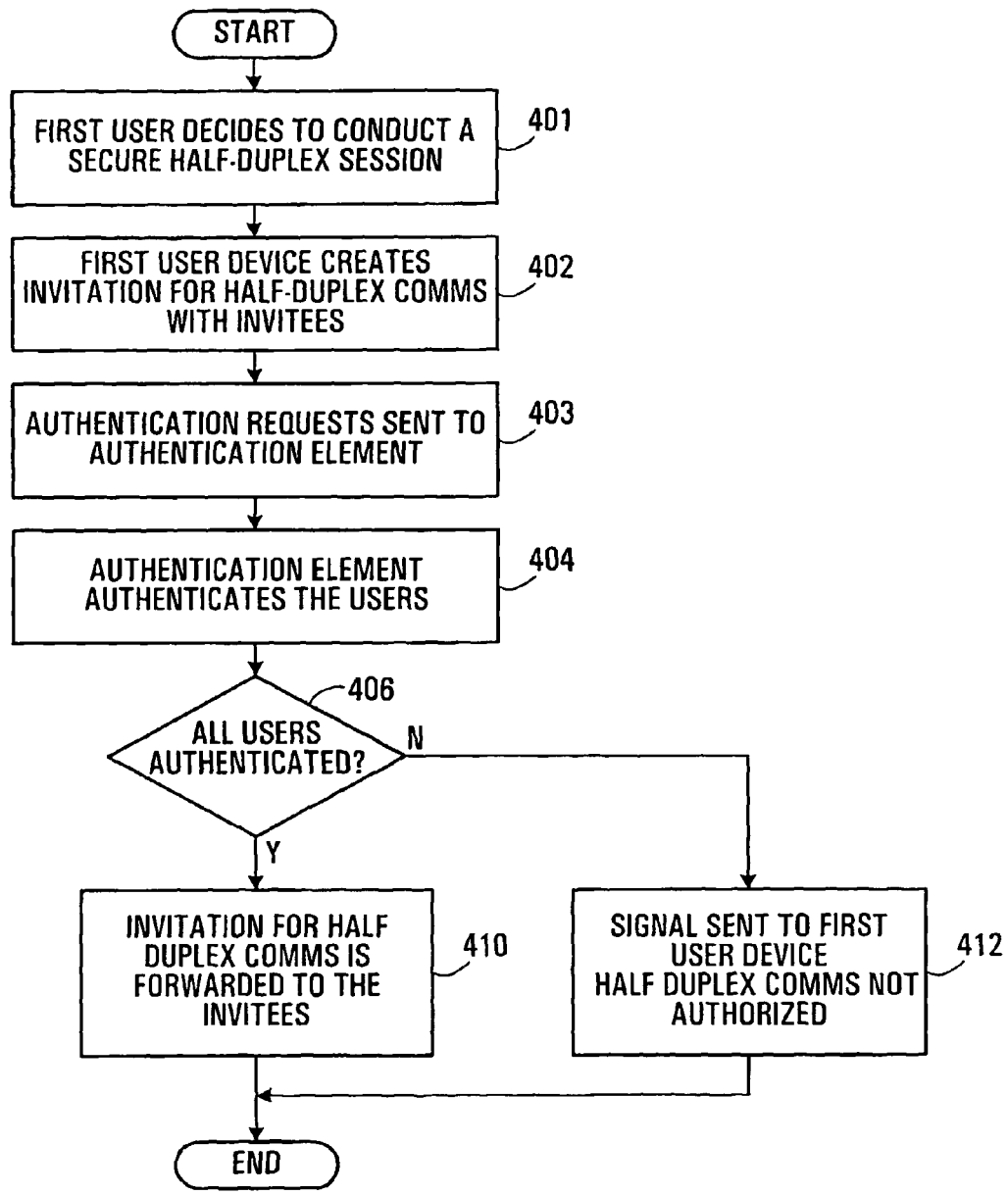
FIG. 3 is a flowchart showing a method of authenticating half-duplex communication users.

FIG. 3 is a flow chart showing a method of authenticating wireless user devices in half-duplex communications within the architecture shown in FIG. 2. In general terms, the method begins with a private user deciding to conduct an authenticated half-duplex communication session using a wireless user device (Step 401). In some embodiments this is achieved by selecting an authentication mode from a menu presented on the wireless user device. Another option on such a menu can include a regular half-duplex session. Once an authenticated half-duplex session is chosen, then an invitation is created by the wireless user device for authenticated half-duplex communications with a set of one or more invitees having private invitee user devices (Step 402). The invitation will trigger the access network to route an authentication request to the private authentication element. At Step 403, the authentication request is routed to the private authentication element through the carrier network. The private authentication element authenticates the wireless user devices and the private invitee user devices (Step 404). Any type of authentication may be implemented here. In one embodiment, Step 404 involves verifying that all of the identities of the user and the invitees are on a predetermined list prepared by the private organisation. The private authentication element sends an authentication response back to the CHDP indicating whether or not the wireless user device and private invitee user device have been authenticated (Step 406). If the wireless user device and the private invitee user devices are authenticated, the invitation is sent by the CHDP to the private invitee user devices to join in the half-duplex communication session (Step 410). If at Step 406, it is determined that the wireless user device or one of the private invitee user devices is not authenticated, a failure signal is sent to the wireless user device through the carrier network.

In some embodiments of the architecture and method shown in FIGS. 2 and 3, the identities of the user and invitees sent to and from the private authentication element 202 are encrypted. Furthermore, in some embodiments, the users are clients of more than one wireless carrier network.

In some embodiments, the verification of a group by the private authentication element confirms for the invitees that the request for half-duplex communication has been authenticated for the entire group.

In the embodiments that follow, the private organisation is described as a corporation. However, the embodiments equally apply to any organisation wishing to authenticate its users of half-duplex communications. The wireless user device in the embodiments that follow is described as a PoC client device. More generally, embodiments are applicable to any wireless user device and system, as previously defined, with half-duplex capabilities. Furthermore, while half-duplex communication is preferred, other embodiments are applicable to instant communications generally. These may be half-duplex, full duplex or text based.

Figure 4:
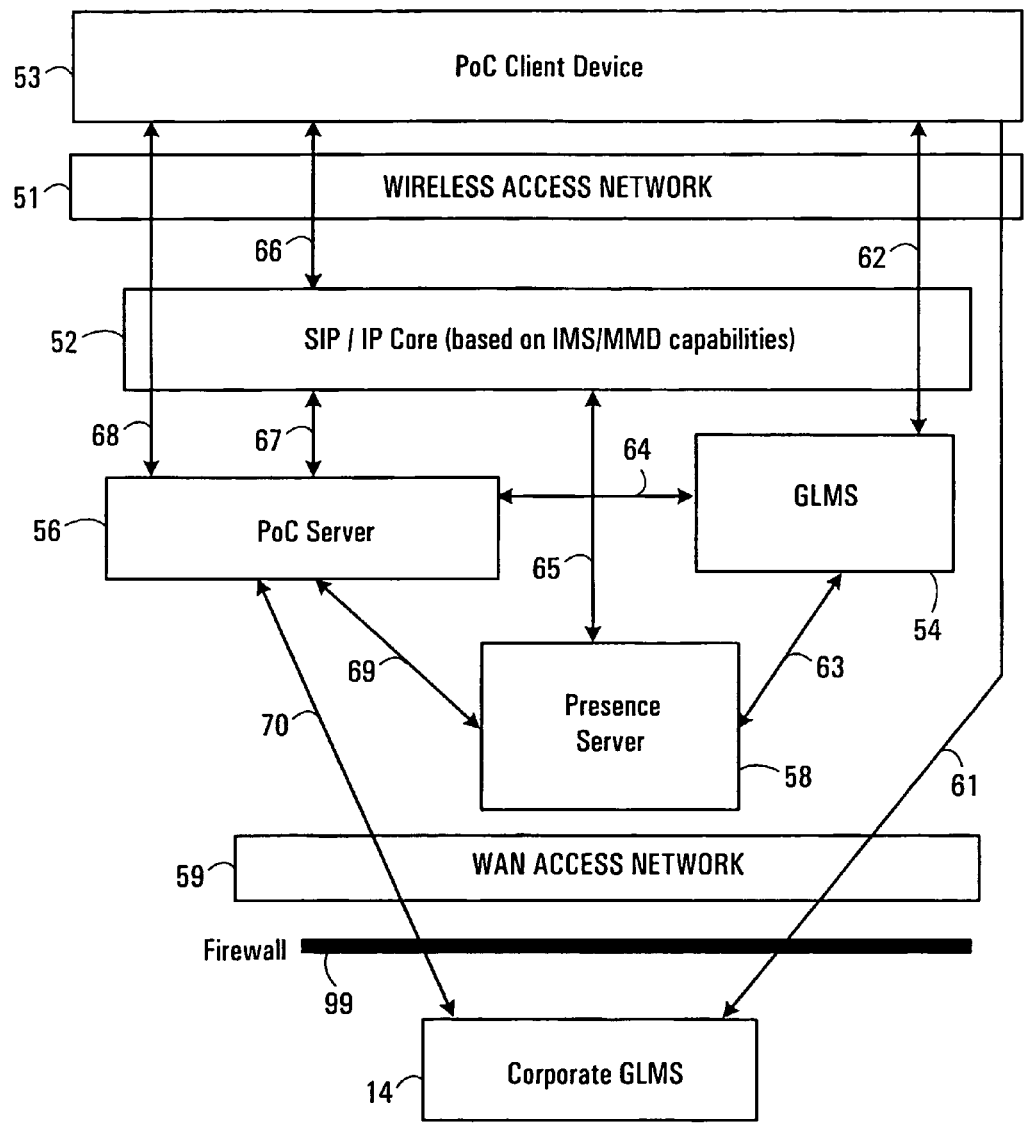
FIG. 4 is a block diagram of a first proxy system used in conjunction with a carrier-based PoC service.

Turning to FIG. 4, there is shown an illustration of a first embodiment for a proxy-like PoC architecture used in conjunction with a carrier-based PoC service. FIG. 4 shows a PoC client device 53 with added authentication features that accesses a wireless carrier network and a corporate GLMS 14, which is within a corporate firewall 99, if present. The wireless carrier includes a SIP/IP core 52, a GLMS 54, a PoC server 56, and a Presence Server 58. The PoC client device 53 is in communication with the corporate GLMS 14 via interface 61, the SIP/IP core 52 via interface 66, the wireless carrier GLMS 54 via interface 62 and the wireless network PoC server 56 via interface 68. The SIP/IP core 52 is in communication with the PoC server 56 via interface 67 and the Presence Server 58 via interface 65. The Presence Server 58 also has interfaces with the GLMS 54 (interface 63) and the PoC server 56 (interface 69). The carrier GLMS 54 communicates with the PoC server 56 via interface 64. The corporate GLMS also has an interface 70 with the PoC server 56. A wireless access network 51 is shown, through which the PoC client device accesses the carrier network components. A WAN access network 59 is also shown, through which the corporate GLMS 14 accesses the carrier network components. In some embodiments, the interfaces in this architecture are standard interfaces, such as those described in the OMA standards referred to above, such as some form of TCP/IP or UDP/IP communications over a data portion of a carrier's network. Examples include XML, HTTP, SIP or RTP over a TCP/IP or UDP/IP type communication stacks.

The embodiment shown in FIG. 4 provides a corporate-based GLMS 14 functioning in-line with the existing PoC system within the carrier network's domain. The corporate GLMS 14 is used for authentication of attendees to a PoC chat session. The corporate GLMS 14 is also used by the corporation to create private authenticated identifies for each corporate user. These authenticated identities can be used without disclosing the true identity to the general public or to the carrier network directly. In some embodiments this is achieved with authentication keys and certificates, which can be seen by other PoC users without compromising their integrity.

Preferably, the corporate GLMS 14 uses standard interfaces to communicate with PoC components, such as those discussed in the OMA standards referred to above. In this way the corporate GLMS 14 will be able to stay in-step with ongoing standards definitions for these interfaces. However, in some embodiments a proprietary protocol can be used. In some embodiments, the link between the existing PoC network components and the corporate GLMS 14 is through a traditional WAN interface 59.

The corporate GLMS 14 makes itself known to the existing network PoC components so that a relationship can be established and there is an indication of what domain is supported by the corporate GLMS 14.

The PoC server 56 communicates with the corporate GLMS 14 to authenticate the requesting user device and/or the invitees under circumstances defined for a given implementation. In some embodiments this authentication is triggered by the requesting user device having an address within a specified domain. This authentication can be triggered by the invitee(s) having an address within a specified domain. This authentication can be triggered by a flag or other indication in the request.

Thus, in a specific example, the corporate GLMS 14 registers with the PoC server 56 and the carrier GLMS 54 for a specific domain type space and users that request groups or identities that are within this domain space are confirmed through the private GLMS. For example, users with a SIP address of SIP:USERX@companyY.NetworkZ.COM are supported by the corporate GLMS called "CompanyY" and the corporate GLMS' address on the Internet is X.X.X.Y.

The corporate GLMS 14 is a part of an identity and authorization process. In the conventional system, the PoC Server 56 assumes the SIP identities are valid. SIP uses a Uniform Resource Identifier (URI) to identify and authorize valid mobile stations within the network. It is also been proposed that E.164 (MS-ISDN or phone numbers) can be used to address and verify identity. According to one aspect, this authorization is complemented by a secondary authorization by the corporate GLMS 14. In this role the corporate GLMS 14 acts like a 'AAA' server (Authentication, Authorization and Accounting). This reduces some of the complications of placing this function within the carrier network's infrastructure directly.

Figure 5:
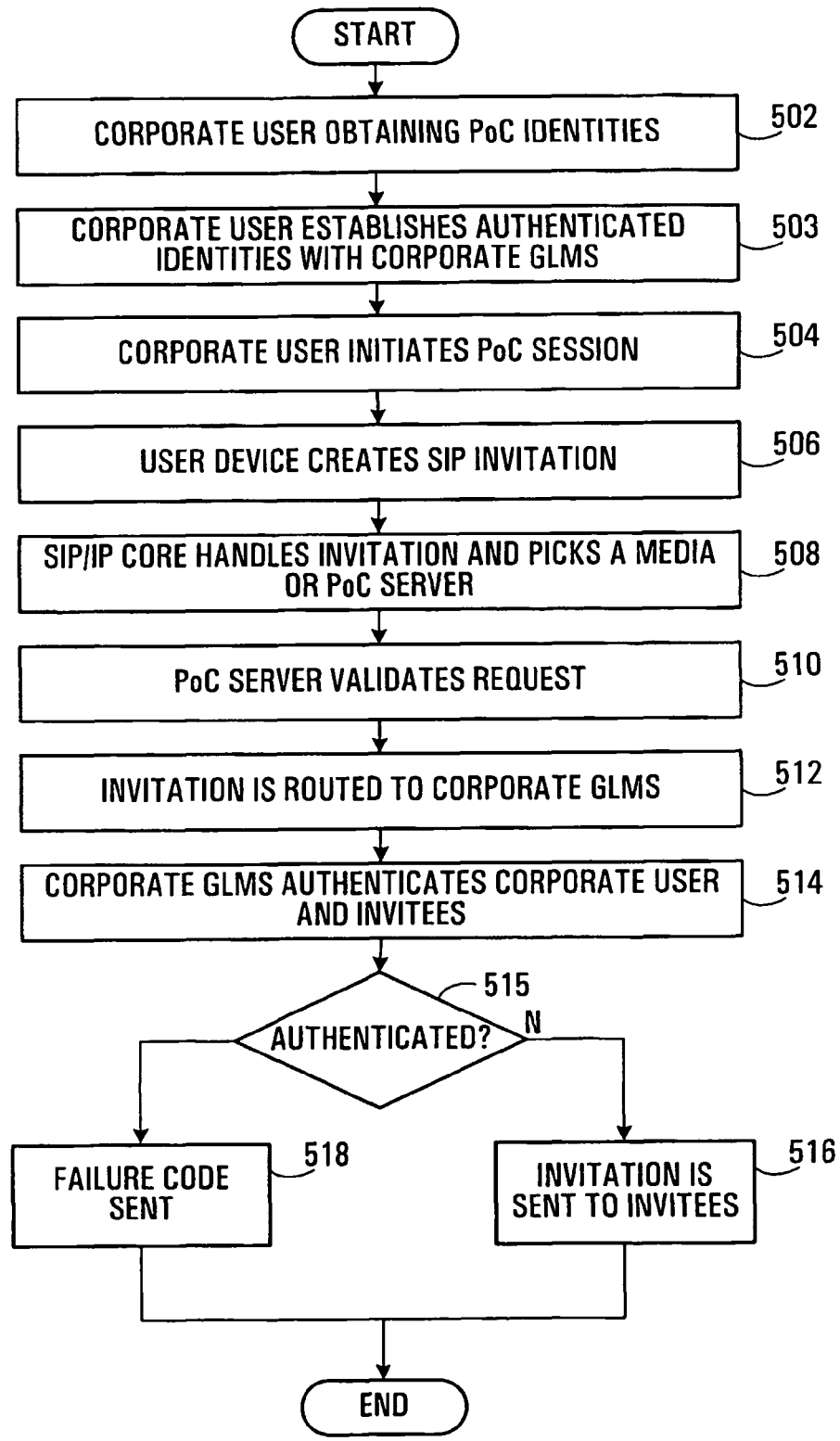
FIG. 5 is a flowchart of a method of authenticating PoC users within a PoC architecture.

Turning now to FIG. 5, there is shown a flowchart of a method of authenticating the PoC. The assumption is that the users are corporate users who want to conduct an authenticated PoC session. If the users are regular users or a corporate user operating as a regular user, then the call is processed normally (i.e. in a conventional manner). The method begins with a corporate user having a PoC client device with added authentication features obtaining PoC identities (Step 502). In some embodiments these PoC identities are used to populate an address book. The PoC identities may be identified as requiring authentication or not. The PoC identities requiring authentication are established with the corporate GLMS (Step 503). In the architecture of FIG. 4, this is done over interface 61. Using the PoC client device 53, the corporate user initiates an authenticated PoC session (Step 504). In some embodiments, this is done by selecting an authentication mode from a menu. Alternatively, it may be done by selecting authenticated identities as invitees. The PoC client device 53 creates a SIP invitation (Step 506). The invitation will include SIP identities and authentication tags obtained from the corporate GLMS 14. The SIP/IP core 52 handles the invitation (Step 508). This involves some SIP processing, picking a media or PoC server 56 and sending the invitation to the PoC server. The PoC server 56 will validate the PoC request with a GLMS component and identify the session as a regular or authenticated session (Step 510). Based on attributes of the PoC request, the authentication request is routed to the corporate GLMS 14 (Step 512) by the PoC server, where the corporate user and invitees are authenticated and the invitation is secured (Step 514). An example of an attribute is a security key. Examples of methods of authentication include public key or symmetric key technology. Based on the success of authentication, half-duplex communications are authorized or not (Step 515). The signal indicating whether or not that authentication was successful is sent back to the PoC server through interface 70. If authorized, the invitation is sent to the invitees (Step 516). Once the invitees have accepted the PoC server will transition the connection to a media server to exchange voice data. If authentication fails, the corporate GLMS sends a response to the PoC server over interface 70 indicating that authentication has failed.

In another embodiment, the method of FIG. 5 can be adapted to authenticate new participants before they join an authenticated half-duplex conversation that is in progress.

Further, in some embodiments, a corporate identity is sent by the PoC client device 53 over the interface 61 to the corporate GLMS 14 in the process of obtaining identities of private wireless user devices and to the PoC Server 56 via interface 68 with PoC session requests. This corporate identity is preferably encrypted using one of many available encryption techniques including but not limited to PGP, S/MIME, Triple DES, AES, ECC using either public keys or private symmetric keys. This corporate identity field is encoded by the PoC client device 53 such as a mobile station and can only be decoded by the corporate GLMS component 14 as no other entity has the necessary information.

For example across a standard Im interface between a PoC client device and a GLMS, the HTTP command might look like the following:

```
GET http://glms.networkA.com/script?action=create_list_set&owne
    r=sip%3Gary.mousseau%40gprs.ca&list_displayname=Private Co-
    Workers HTTP/1.1
Authorization: Digest username="u45671234",
    realm="glms.rogers.ca",
    nonce="dcd11b7702ee4f0e8b11d0f600bfb0c093",
    uri="http://glms.networkA.com/script?action=create_list_set
    &owner=sip%3Gary.mousseau%40gprs.ca&list_displayname=Co-
    Workers",
    response="e988c992a9123456e42c8ee200cec7f6",
    cnonce="dcd99agsjjkla123452dd2f0e8b1",
    opaque="12345ccdd03ebaf9f0171e9517f40e41",
    qop=auth-int,
    nc=00000001
```

When sent directly to the corporate GLMS component 14 by the PoC client device via interface 61 (as shown in FIG. 4), the command would be changed in several ways to appear as follows:

```
GET http://glms.companyA.com/script?action=create_list_set&
    owner=sip%3Gary.mousseau%40gprs.ca&list_displayname=
    Private&private-ID="T8&%$34%$#4" Co-Workers HTTP/1.1
Authorization: Digest username="u45671234",
    realm="glms.rogers.ca",
    private_GLMS="glms_Accounting.CompanyX.com",
    nonce="dcd11b7702ee4f0e8b11d0f600bfb0c093",
    uri="http://glms.networkA.com/script?action=create_list_set
    &owner=sip%3Gary.mousseau%40gprs.ca&list_displayname=Co-
    Workers",
    response="e988c992a9123456e42c8ee200cec7f6",
    cnonce="dcd99agsjjkla123452dd2f0e8b1",
    opaque="12345ccdd03ebaf9f0171e9517f40e41",
    qop=auth-int,
    nc=00000001
```

The addition of a new domain name 'glms.company A.com' allows the HTTP request to be routed directly to the corporate GLMS 14 through the public Internet access point offered by most carriers today via interface 61.

Another embodiment involves extended addressing made to SIP requests that get passed along to the PoC server 56 from the PoC client device, as in FIG. 4. For example within the standard SIP and standard interface Ik (the interface between a PoC server and a GLMS) the following would be normal information exchanged:

```
INVITE sip:bob@example.org SIP/2.0
    To: <bob@example.org >
    From: <carol@example.org>;tag=xyz
    Call-Id: 7@c.example.org
    CSeq 1 INVITE
    Contact: <sip:carol@c.example.org>
```

From a PoC client device 53 such as a mobile station modified to work with a corporate GLMS 14 the SIP invitation might look like the following:

```
INVITE sip:bob@example.org "ARZ$%E89@#" SIP/2.0
    To: <bob@example.org> "JUIRT8%$!IJP"
    From: <carol@example.org>"M6%$PQWE9 (+";tag =xyz
    Call-Id: 7@c.example.org
    CSeq 1 INVITE
    Contact: <sip:carol@c.example.org>
```

The presence of the extended address is an indication to the PoC Server 56 that an extended authentication is required for this invitation. If this is the case, the PoC Server 56 sends the encrypted identities to the corporate GLMS 14 via interface 70 for decryption and authentication. The SIP authentication response that is returned to the PoC server indicates which of the participants are authorized to participate in the PoC Session. In another embodiment, the SIP Request authorization header is used to carry credentials of the user. In this situation portions of the header are opaque to all elements of architecture, except for the corporate GLMS 14, meaning those portions can be seen by the carrier network but not understood.

Figure 6:
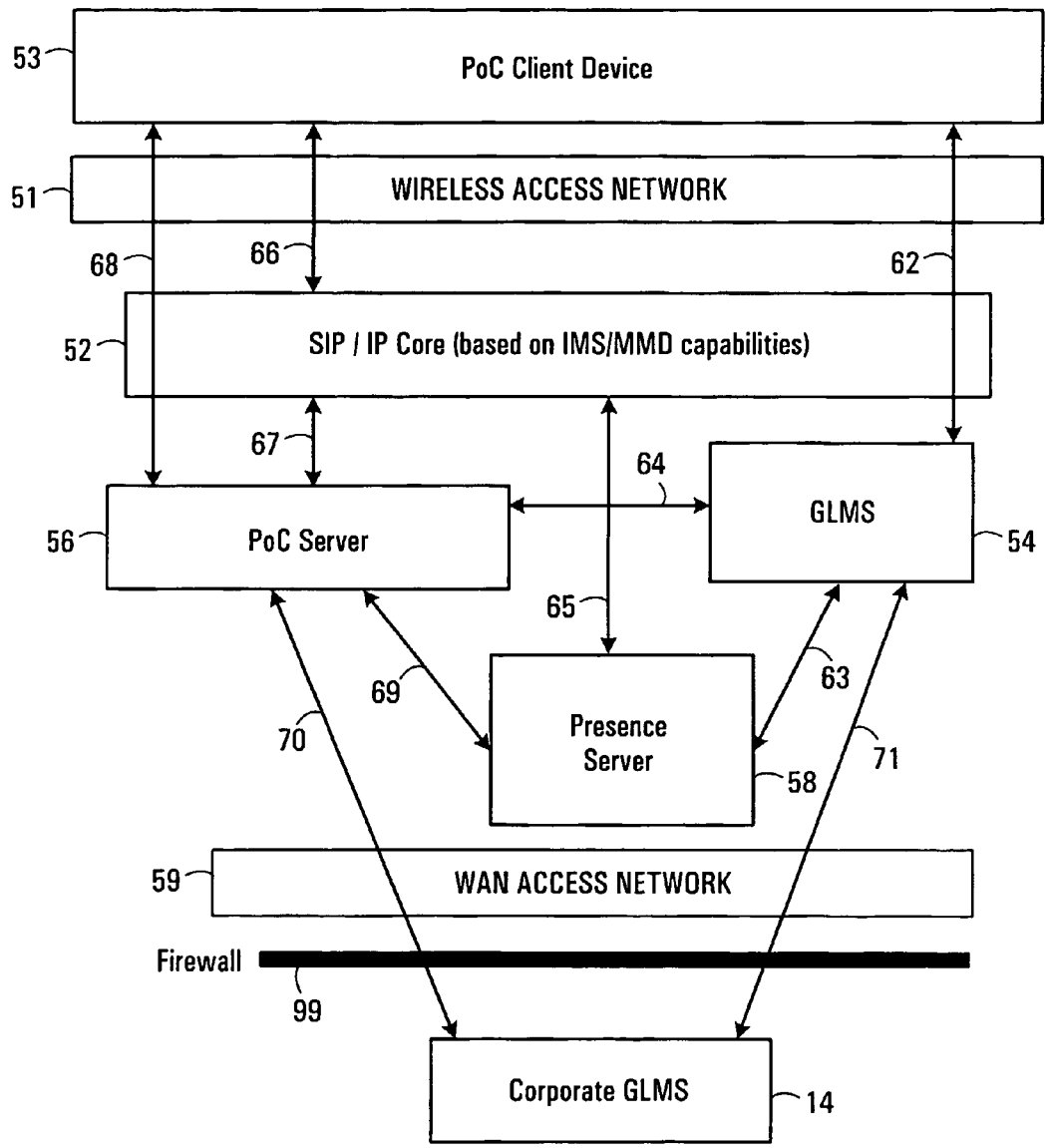
FIG. 6 is a block diagram of a second proxy system used in conjunction with a carrier-based PoC service.

Turning to FIG. 6, there is shown an illustration of a second proxy architecture used in conjunction with a carrier-based PoC service. This embodiment is similar to the one shown in FIG. 4, except the PoC client interface traffic sent to the corporate GLMS 14 originates from the carrier network's GLMS 54. The only difference over the structure shown in FIG. 4 is that there is no interface from the PoC client device to the corporate GLMS 14 and there is an interface 71 between the corporate GLMS 14 and the carrier GLMS 54.

In this illustration there are many choices for the interface protocol that is used between the carrier GLMS 54 and the corporate GLMS 14. In some embodiments, this link labelled 71 could carry standard Im traffic and Ik traffic (where Im is defined as a standard interface between a wireless user device and a GLMS and standard Ik is defined as a standard interface between a PoC server and a GLMS), or it could use a proprietary protocol developed specifically to carry authentication requests. One choice could be to mirror the interface 62 between the PoC client device 53 and the carrier GLMS 54. In some embodiments, this interface 62 uses XML over HTTP, a simple protocol and addressing method that could be mirrored from the PoC client device 53 all the way to the corporate GLMS 14. In this way the configuration of the PoC client device 53 could be simplified and there would be less work needed on the PoC client device 53 to ensure information is relayed to the corporate GLMS 14. For example each PoC client device could be configured as needing corporate GLMS 14 support as they are deployed via a specific corporation. Since the interface between the PoC client device 53 and the corporate GLMS 14 is unique to this embodiment, it is possible to make the interface any desirable choice other than HTTP. As discussed with reference to FIG. 4, the corporate GLMS 14 will make itself known to the carrier network.

In this embodiment, the traffic from the PoC client device 53, such as a mobile station, to the carrier GLMS 54 (interface 62) can be used to carry the information needed for the corporate GLMS 14. As discussed with reference to FIG. 4, a modified HTTP header could carry the encrypted identities to indicate to the carrier GLMS 54 that further authentication is required.

This embodiment has the advantage that the creation of groups and lists can still operate as normal. For those groups and lists being created by corporate users, encrypted private identities would also accompany the creation request. When this does happen and private identities are present, the carrier GLMS 54 recognizes the need for corporate-based authentication and uses interface 71 to acquire that authentication. For all those members of the group that get approval they can be added to the group or list being created. An authentication response is sent back to the carrier GLMS 54 via interface 7.

Figure 7:
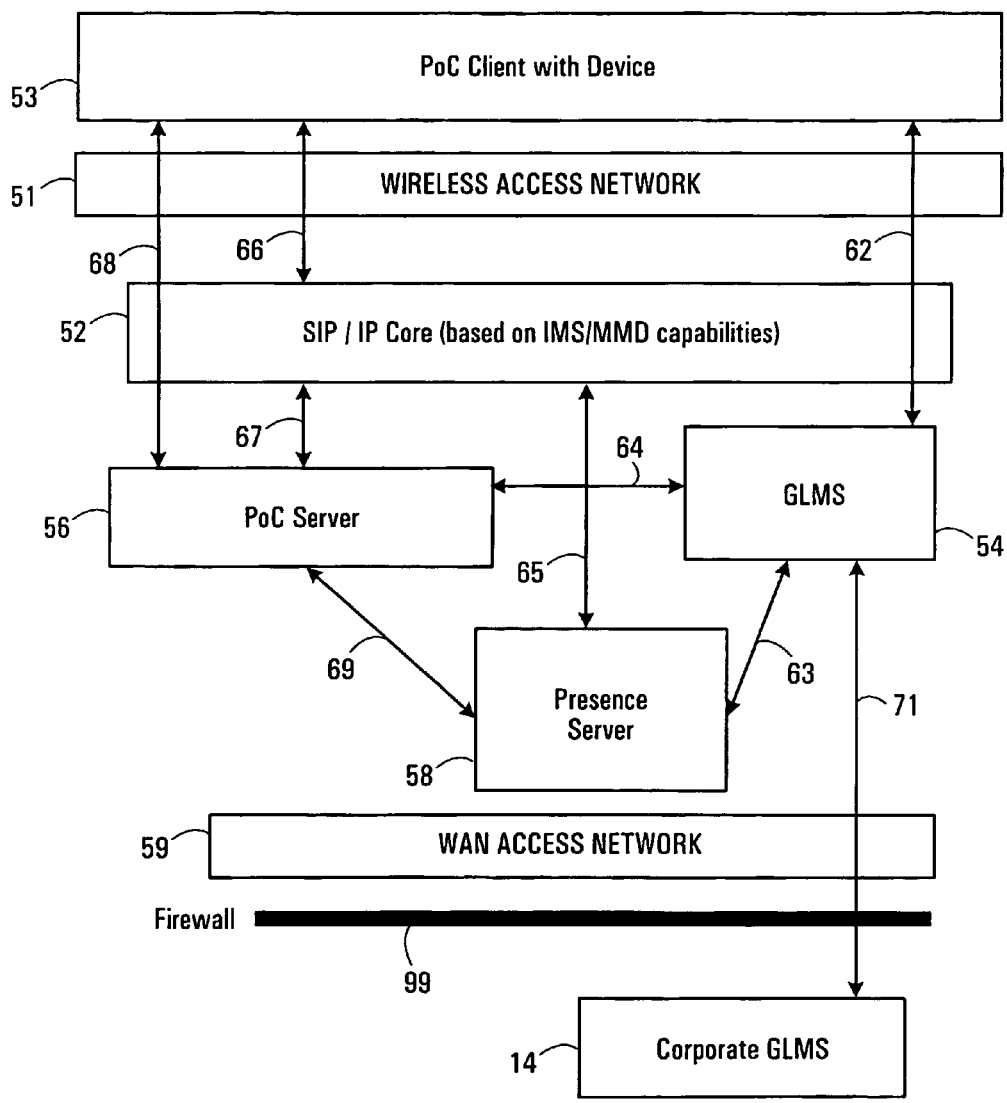
FIG. 7 is a block diagram of a third proxy system used in conjunction with a carrier-based PoC service.

Turning to FIG. 7, there is shown an illustration of a third proxy architecture used in conjunction with a carrier-based PoC service. This embodiment is similar to the first and second embodiments shown in FIGS. 4 and 6. The only difference from FIG. 6 is that there is no interface between the corporate GLMS 14 and the network PoC server 56.

In this embodiment all traffic to the corporate GLMS 14 proceeds through the carrier GLMS 54 via interfaces 62 and 71. All requests for authentication pass through the carrier GLMS 54 and to the corporate GLMS 14 as indicated.

In this embodiment all corporate authentication requests are routed through the carrier GLMS 54. This requires only one special link between the carrier GLMS 54 and the corporate GLMS 14. In some embodiments, this link labelled 71 could carry standard Im traffic and Ik traffic (where Im is defined as a standard interface between a wireless user device and a GLMS and Ik is defined as a standard interface between a PoC server and a GLMS), or it could use a proprietary protocol developed specifically to carry authentication requests. For example the use of an Im interface to the corporate GLMS component 14 could be achieved. The standard Im interface is described and defined to use an XML format transmitted using HTTP. In the discussion of FIG. 4, various ways to modify the HTTP header information so that the carrier GLMS 54 could easily recognize and forward the encrypted identities to the corporate GLMS 14 for further authentication were described.

In the illustration depicted in FIG. 7, there are many choices for the interface protocol that is used between the carrier GLMS 54 and the corporate GLMS 14. One of these choices could be to use the same type of interface as between the PoC client 53 and the carrier GLMS 54. This embodiment has the advantage of reducing the requirements for the PoC Server 56 as an interface to the corporate GLMS 14 is not required. For those PoC client devices that indicate a corporate connection, PoC session requests are verified through the carrier GLMS 54 and then relayed on to the corporate GLMS 14 via interface 71. As discussed with reference to FIG. 4, the corporate GLMS will have made itself known to the carrier network and the SIP addresses used by the PoC client device 53 will indicate to the carrier GLMS 54 that they are within the domain supported by the corporate GLMS 14. Only if a positive feedback is returned to the carrier GLMS 54 over interface 71, will PoC invitations be extended to the one or many invitees.

The above-described embodiments of the present invention are intended to be examples only. Those of skill in the art may effect alterations, modifications and variations to the particular embodiments. For example, in other embodiments the private authentication element sits on a server within the carrier network.

The invention claimed is:

1. A method comprising:
   a wireless user device interacting with a private authentication element to obtain identities of private user devices;
   the wireless user device sending, via a wireless communication network, a request to a CHDP (carrier half-duplex processing element) of the wireless communication network, the request identifying at least one invitee private user device;
   the CHDP sending a request for authentication of the at least one invitee private user device to the private authentication element; the private authentication element authenticating the at least one invitee private user device and sending an authentication response to the CHDP indicating whether or not the at least one invitee private user device is authenticated;
   the CHDP sending invitations to authenticated invitee private user devices and receiving acceptances/rejections; and the CHDP setting up a half-duplex communications session for authenticated users that have accepted the invitation.

2. The method of claim 1 further comprising: the private authentication element registering with the CHDP to perform authentication for a particular domain.

3. The method of claim 1 wherein the half-duplex communications session is a Push-to-Talk™ over Cellular (PoC) session.

4. The method of claim 1 wherein sending a request comprises sending the request to a PoC server of the CHDP.

5. The method of claim 4 wherein the CHDP further comprises a carrier GLMS (Group List Management Server).

6. The method of claim 1, wherein interacting further comprises using a carrier GLMS as an intermediary.

7. The method of claim 1 wherein sending an authentication response uses a carrier GLMS as an intermediary.

8. The method of claim 1 wherein the private authentication element is a GLMS.

9. The method of claim 1 further comprising the wireless user device encrypting an identity of the at least one invitee private user device.

10. A method comprising:
a private authentication element interacting with a wireless user device which operates in a wireless communication network to establish private identities of private user devices;
the private authentication element receiving a request for authentication of the private identities from a carrier half-duplex processing element of the wireless communication network associated with a requested half-duplex communications session from the wireless user device;
the private authentication element authenticating the private identities; and
the private authentication element sending an authentication response to the carrier half-duplex processing element indicating whether or not the private identities are authenticated.

11. The method of claim 10 wherein interacting comprises the private authentication element interacting with the wireless user device via a carrier GLMS.

12. The method of claim 10 wherein:
receiving comprises receiving the request from a PoC server; and
sending comprises sending the authentication response to the PoC server.

13. The method of claim 12 wherein:
receiving comprises receiving the request from the PoC server via a carrier GLMS; and
sending comprises sending the authentication response to the PoC server via the carrier GLMS.

14. The method of claim 10 wherein the private authentication element is a GLMS.

15. The method of claim 10 further comprising the private authentication element registering with the carrier half-duplex processing element to perform authentication for a particular domain.

16. A private authentication element configured to perform the method of claim 10.

17. The authentication element of claim 16 comprising a private GLMS.

18. A method in a wireless user device comprising:
the wireless user device interacting with a private authentication element to obtain private identities of private user devices; and
the wireless user device sending, via a wireless communication network, a request for half-duplex communication identifying at least one invitee private user device to a CHDP, the request indicating to the CHDP of the wireless communication network to perform authentication of the at least one invitee private user device with the private authentication element.

19. The method of claim 18 wherein interacting comprises the wireless user device populating an address book with the private identities obtained from the private authentication element.

20. The method of claim 18, wherein the half-duplex communications are PoC communications.

21. The method of claim 18, interacting comprises interacting with a private GLMS.

22. A wireless user device configured to perform the method of claim 18.

23. A wireless user device of claim 18, configured to operate in a private mode and a regular mode.

24. The wireless user device of claim 18, configured to encrypt the identities.

25. A carrier half-duplex processing element (CHDP) for use in a wireless communication network, the CHDP comprising:
a first input for receiving, via the wireless communication network, requests from a client device for half-duplex communications session with at least one private user device in response to which the CHDP generates an authentication request for authentication of private identities of private user devices;
an output for sending the authentication request to a private authentication element;
a second input for receiving an authentication response from the private authentication element; and
wherein in the event of successful authentication, the CHDP invites the private user devices to participate in the half-duplex communications session and sets up a half-duplex communications session between devices that accept.

26. The carrier half-duplex processing element of claim 25 wherein the half-duplex communications session is a PoC session and the CHDP comprises a PoC server.

27. The carrier half-duplex processing element of claim 26 further comprising a GLMS, wherein the authentication request is sent by the PoC server to the private authentication element via the GLMS server.

28. The carrier half-duplex processing element of claim 27, wherein the authentication response is received by the PoC server via the GLMS server.

29. A system for authenticating private users from a private network when conducting instant communications over a carrier network, the system comprising:
a carrier processing element of the carrier network which is configured to receive a request for an instant communications session from a wireless user device, to send an authentication request of an identity of at least one private invitee user device to a private authentication element, to send an invitation for the instant communications session to the at least one private invitee user device if an authentication is response received from the private authentication element, and to set up the instant communications session between the wireless user device and the at least one private invitee user device; and
a private authentication element of a private network outside of the carrier network, the private authentication element being configured to establish authenticated identities of private user devices, to receive the authentication request from the carrier processing element of the carrier network, to authenticate the identities and to send the authentication response back to the carrier processing element indicating whether or not the identities are authenticated.

30. The method of claim 1, wherein the private authentication element is connected in a private communication network.

31. The method of claim 10, wherein the private authentication element is connected in a private communication network.

32. The method of claim 18, wherein the private authentication element is connected in a private communication network.

33. The CDHP of claim 25, wherein the output is for sending the authentication request to a private authentication element which is connected in a private communication network.

* * * * *